US012781011B2

(12) United States Patent
Liu et al.

(10) Patent No.: US 12,781,011 B2
(45) Date of Patent: Nov. 3, 2026

(54) SUPERCRITICAL THERMOPLASTIC FOAM ELASTOMER MATERIAL AND PREPARATION METHOD AND APPLICATION THEREOF

(71) Applicant: Dongguan Hailex New Material Science and Technology Co., Ltd, Dongguan (CN)

(72) Inventors: Runhong Liu, Dongguan (CN); Xiaojun Xu, Dongguan (CN); Zhaoyang Zhou, Dongguan (CN); Ho Yik, Dongguan (CN)

( * ) Notice: Subject to any disclaimer, the term of this patent is extended or adjusted under 35 U.S.C. 154(b) by 943 days.

(21) Appl. No.: 18/058,249

(22) Filed: Nov. 22, 2022

(65) Prior Publication Data

US 2024/0166834 A1 May 23, 2024

(51) Int. Cl.
*C08J 9/12* (2006.01)
*C08J 9/00* (2006.01)

(52) U.S. Cl.
CPC ............. *C08J 9/122* (2013.01); *C08J 9/0023* (2013.01); *C08J 2203/06* (2013.01); *C08J 2203/08* (2013.01); *C08J 2207/00* (2013.01)

(58) Field of Classification Search
CPC ...... C08J 9/122; C08J 9/0023; C08J 2203/06; C08J 2203/08; C08J 2207/00; C08J 9/0066
See application file for complete search history.

(56) References Cited

U.S. PATENT DOCUMENTS

2018/0237605 A1* 8/2018 Chang ................ C08G 18/3284
2021/0095091 A1* 4/2021 Hayashi ..................... C08J 9/16

FOREIGN PATENT DOCUMENTS

WO WO-2022162048 A1 * 8/2022 .............. C08J 9/232

* cited by examiner

*Primary Examiner* — K. Boyle
(74) *Attorney, Agent, or Firm* — Novoclaims Patent Services LLC; Mei Lin Wong

(57) ABSTRACT

Disclosed are a supercritical thermoplastic foam elastomer material and a preparation method and application thereof, belonging to the technical field of foam materials. The supercritical thermoplastic foam elastomer material comprises a thermoplastic elastomer, talc powder, a chain extender and an auxiliary material. According to the invention, a TPU raw material is injection-molded into a shape corresponding to a midsole, and can be directly molded after foaming without being cut. In addition, because the TPU raw material is integrally formed by injection molding, the particles of the popcorn material will not be adhered, and the defect of adhesion between the particles can be ameliorated.

5 Claims, No Drawings

SUPERCRITICAL THERMOPLASTIC FOAM ELASTOMER MATERIAL AND PREPARATION METHOD AND APPLICATION THEREOF

BACKGROUND OF THE PRESENT INVENTION

Field of Invention

The present invention relates to the technical field of foam materials, and in particular to a supercritical thermoplastic foam elastomer material and a preparation method and application thereof.

BACKGROUND OF THE INVENTION

Description of Related Arts

At present, TPU (thermoplastic polyurethane elastomer) soles available on the market are mainly classified into two types, one type is soles formed by using a TPU popcorn technology. A popcorn TPU foam material is prepared as follows: a supercritical fluid is permeated into a TPU particle raw material through a supercritical technology to form a polymer/gas homogeneous system, an equilibrium state of the polymer/gas homogeneous system in the material is then broken by a heating and depressurization method, and a bubble nucleus is formed in the material and grows and shapes to obtain a pre-foamed TPU foam particle material; and then pressurization and heating pretreatment is carried out so that particles which are 5 mm originally can expand like popcorns, and finally the TPU popcorn material is formed. The size of the elliptical particle containing a closed bubble will be increased by two or three times, and the inner bubble of the particle will contain a large amount of gas. The other type is soles made of an extruded TPU sheet. The TPU sheet is formed by an extrusion process, and then a foam body in the shape of a sole is cut out and then subjected to compression molding.

However, the limitation of the TPU popcorn technology is that the color design is monotonous, the bonding strength between particles is low, and the loss of TPU extrusion process for sheet processing is very large. Therefore, it is urgent to find a preparation process of a thermoplastic polyurethane elastomer material, which is of great significance to improve the mechanical strength of the material and reduce the loss of the material.

SUMMARY OF THE PRESENT INVENTION

In view of this, the present invention provides a supercritical thermoplastic foam elastomer material and a preparation method and application thereof, wherein a TPU raw material is injection-molded into a shape corresponding to a midsole, and can be directly molded after foaming without being cut. In addition, because the TPU raw material is integrally formed by injection molding, the particles of the popcorn material will not be adhered, and the defect of adhesion between the particles is ameliorated.

In order to achieve the above object of the present invention, embodiments of the present invention adopt the following technical solution:

A supercritical thermoplastic foam elastomer material, comprising the following components: 80-120 parts of a thermoplastic elastomer, 3-7 parts of talcum powder, 8-12 parts of a chain extender and 2-6 parts of an auxiliary agent.

Optionally, the thermoplastic elastomer is an aromatic polyether TPU, an aliphatic polyester TPU, an aliphatic polyether TPU or an aromatic polyester TPU.

Optionally, the chain extender is 1,4-butanediol, ethylene glycol, propylene glycol, diethylene glycol, neopentyl glycol or glycerol.

Optionally, the auxiliary agent is stearic acid or industrial oil.

The embodiments of the present invention further provide a preparation method of a supercritical thermoplastic foam elastomer material, comprising the following steps:

step 1, weighing raw materials accord to a formula ratio, blending a thermoplastic elastomer, talcum powder, a chain extender and an auxiliary agent by using a double-screw extrusion device, and modifying the thermoplastic elastomer at a temperature higher than a melting point of the material;

step 2, carrying out an injection molding or extrusion process on the product obtained in step 1 at a temperature higher than a glass softening point and lower than the melting point to obtain a special-shaped thermoplastic elastomer piece or sheet;

step 3, reheating the special-shaped piece or sheet obtained in step 2 to a temperature higher than the glass softening point of the material, baking the special-shaped piece or sheet for 2-8 h at a temperature lower than a glass transition temperature of the material, and carrying out normalizing treatment;

step 4, in an autoclave, introducing $N_2$ and water vapor in an autoclave body to permeate the special-shaped TPU piece or sheet placed in the autoclave body, forming a polymer/gas homogeneous system after a certain time, breaking an equilibrium state of the polymer/gas homogeneous system in the material by using a heating/depressurization method, forming a bubble nuclei in the material and growing and shaping the bubble nuclei; and step 5, carrying out compression molding on the TPU small foam material obtained in step 4.

Optionally, a temperature inside the reactor in step 4 is greater than a boiling point of water.

Optionally, a volume ratio of $N_2$ to water vapor in step 4 is (3-7):1.

Optionally, a pressure in step 4 is greater than 45 Mpa.

Optionally, the time in step 4 is 4-8 h.

The present invention further provides an application of the supercritical thermoplastic foam elastomer material prepared by the above preparation method of a supercritical thermoplastic foam elastomer material in a sole.

Compared with the prior art, the present invention has the following beneficial effects:

(1) Compared with a sole formed by the supercritical popcorn technology, the sole of the present invention has obvious advantage in the aspect of the mechanical strength of the material, has a tensile strength improved from more than 10 kgf/cm$^2$ to more than 12 kgf/cm$^2$, approximately by about 10-20%.

(2) Compared with a process for processing a sole by using a supercritical TPU foam sheet, the present invention can greatly reduce material loss by 40-60%.

DETAILED DESCRIPTION OF THE PREFERRED EMBODIMENT

In order to make the objects, technical solutions and advantages of the invention more comprehensible, the present invention will be further described in detail below in conjunction with the embodiments. It should be understood that the specific embodiments described herein are merely illustrative of the invention and are not intended to limit the invention.

Example 1

The example of the present invention provides a preparation method of a supercritical thermoplastic foam elastomer, comprising the following steps:

step 1, weighing 100 parts of aromatic polyether 5039, 5 parts of talcum powder, 10 parts of 1,4-butanediol and 4 parts of stearic acid accord to the above formula, blending the raw materials by using a double-screw extrusion device, and modifying the polyether 5039 at a temperature higher than a melting point of the material;

step 2, carrying out an injection molding or extrusion process on the product obtained in step 1 at a temperature higher than a glass softening point (120° C.) and lower than the melting point (180° C.) to obtain a special-shaped thermoplastic elastomer piece or sheet;

step 3, reheating the special-shaped piece or sheet obtained in step 2 to a temperature higher than the glass softening point (120° C.) of the material, baking the special-shaped piece or sheet for 4 h at a temperature lower than a glass transition temperature of the material, and carrying out normalizing treatment; and pretreating the special-shaped TPU piece or sheet to eliminate the stress of the special-shaped TPU piece or sheet;

step 4: in an autoclave, introducing $N_2$ and water vapor into an autoclave body to permeate the special-shaped TPU piece or sheet placed in the autoclave body, wherein a volume ratio of $N_2$ to water vapor is 5:1, the time is 6 h, the pressure is greater than 45 Mpa, and the temperature is 120° C.; forming a polymer/gas homogeneous system, breaking an equilibrium state of the polymer/gas homogeneous system in the material by using a heating/depressurization method, forming a bubble nuclei in the material and growing and shaping the bubble nuclei; and step 5, carrying out compression molding on the TPU small foam material obtained in step 4.

Example 2

The example of the present invention provides a preparation method of a supercritical thermoplastic foam elastomer, comprising the following steps:

step 1, weighing 80 parts of aliphatic polyester A902, 3 parts of talcum powder, 8 parts of diethylene glycol and 3 parts of industrial oil accord to the above formula, blending the raw materials by using a double-screw extrusion device, and modifying the aliphatic polyester, wherein the temperature is required to be higher than the melting point (180° C.) of the material;

step 2, carrying out the injection molding or extrusion process on the product obtained in step 1 at a temperature higher than a glass softening point (120° C.) and lower than the melting point (180° C.) to obtain a special-shaped thermoplastic elastomer piece or sheet;

step 3, reheating the special-shaped piece or sheet obtained in step 2 to a temperature higher than the glass softening point of the material, baking the special-shaped piece or sheet for 4 h at a temperature lower than a glass transition temperature of the material, and carrying out normalizing treatment; and pretreating the special-shaped TPU piece or sheet to eliminate the stress of the special-shaped TPU piece or sheet;

step 4: in an autoclave, introducing $N_2$ and water vapor into an autoclave body to permeate the special-shaped TPU piece or sheet placed in the autoclave body, wherein a volume ratio of $N_2$ to water vapor is 3:1, the time is 4 h, the pressure is greater than 45 Mpa, and the temperature is 120° C.; forming a polymer/gas homogeneous system, breaking the equilibrium state of the polymer/gas homogeneous system in the material by using a heating/depressurization method, forming a bubble nuclei in the material and growing and shaping the bubble nuclei; and step 5, carrying out compression molding on the TPU small foam material obtained in step 4.

Example 3

The example of the present invention provides a preparation method of a supercritical thermoplastic foam elastomer, comprising the following steps:

step 1, weighing 120 parts of aliphatic polyether H190A, 7 parts of talcum powder, 12 parts of neopentyl glycol and 6 parts of stearic acid accord to the above formula, blending the raw materials by using a double-screw extrusion device, and modifying the aliphatic polyether, wherein the temperature is required to be higher than the melting point (125° C.) of the material;

step 2, carrying out the injection molding or extrusion process on the product obtained in step 1 at a temperature higher than a glass softening point (125° C.) and lower than the melting point (185° C.) to obtain a special-shaped thermoplastic elastomer piece or sheet;

step 3, reheating the special-shaped piece or sheet obtained in step 2 to a temperature higher than the glass softening point of the material, baking the special-shaped piece or sheet for 4 h at a temperature lower than a glass transition temperature of the material, and carrying out normalizing treatment; and pretreating the special-shaped TPU piece or sheet to eliminate the stress of the special-shaped TPU piece or sheet;

step 4: in an autoclave, introducing $N_2$ and water vapor into an autoclave body to permeate the special-shaped TPU piece or sheet placed in the autoclave body, wherein a volume ratio of $N_2$ to water vapor is 7:1, the time is 8 h, the pressure is greater than 45 Mpa, and the temperature is 120° C.; forming a polymer/gas homogeneous system, breaking the equilibrium state of the polymer/gas homogeneous system in the material by using a heating/depressurization method, forming a bubble nuclei in the material and growing and shaping the bubble nuclei; and step 5, carrying out compression molding on the TPU small foam material obtained in step 4.

Comparative Example 1

(1) 100 parts of aromatic polyether 5039 were weighed and placed in an autoclave, and a supercritical fluid was permeated into the aromatic polyether 5039 particle raw material at a pressure greater than 45 Mpa and a temperature of 120° C. to form a polymer/gas homogeneous system.

(2) The equilibrium state of the polymer/gas homogeneous phase system in the material was broken by using a temperature rise and pressure reduction method, and a bubble nuclei was formed in the material and grown and shaped to obtain a TPU foam material.

(3) A TPU popcorn material is formed after the pressurization and heating pretreatment.

Comparative Example 2

(1) 100 parts of aromatic polyether 5039 were weighed and placed in an autoclave, and a supercritical fluid was permeated into the aromatic polyether 5039 sheet at a pressure greater than 45 Mpa and a temperature of 120° C. to form a polymer/gas homogeneous system.

(2) The equilibrium state of the polymer/gas homogeneous phase system in the material was broken by using a temperature rise and pressure reduction method, and a bubble nuclei was formed in the material and grown and shaped to obtain a TPU foam sheet.

(3) The TPU foam sheet was cut into a required midsole size and polished, and then subjected to compression molding on a CMP machine.

Experimental Example

In order to better illustrate the characteristics of the supercritical foamed thermoplastic elastomer material of the present invention, the properties of the materials of Examples 1 to 3 and Comparative Examples 1 to 2 were determined, and the results are shown in Table 1.

TABLE 1

Properties of supercritical thermoplastic foam elastomer materials of Examples 1 to 3 and Comparative Examples 1 to 2

| Experimental example | Specific gravity ($g/cm^3$) | Rebound (%) | Hardness (C) | Compression ratio (%) | Tensile strength ($kgf/cm^2$) |
|---|---|---|---|---|---|
| Example 1 | 0.101 | 70 | 40 | 20 | 14 |
| Example 2 | 0.092 | 75 | 42 | 17 | 15 |
| Example 3 | 0.086 | 77 | 38 | 19 | 15 |
| Comparative Example 1 | 0.122 | 65 | 42 | 35 | 10 |
| Comparative Example 2 | 0.141 | 68 | 45 | 30 | 11 |

It can be seen from Table 1 that the product of the present invention has good mechanical strength and comfort.

The above description is only preferred embodiments of the present invention, and is not intended to limit the present invention. Any modification, equivalent substitution or improvement within the spirit and principle of the present invention shall be included in the scope of the invention.

What is claimed is:

1. A preparation method for preparing a thermoplastic foam elastomer material, the method comprising the following steps:

step 1, weighing and blending a thermoplastic elastomer, talcum powder, a chain extender and an auxiliary agent using a double-screw extrusion device, at a temperature higher than a melting point of the thermoplastic elastomer, thereby forming a product;

step 2, carrying out an injection molding or extrusion process on the product obtained in step 1 at a temperature higher than a glass softening point and lower than the melting point of the product to obtain a shaped piece or sheet from the product;

step 3, re-heating the shaped piece or sheet obtained in step 2 by baking the shaped a piece or sheet for 2 to 8 hours at a temperature lower than a glass transition temperature of the piece or sheet, and then allowing the piece or sheet to return to atmospheric conditions, thereby forming a baked piece or sheet;

step 4, placing the baked piece of sheet in an autoclave and then introducing $N_2$ and water vapor in the autoclave under pressure to allow to allow the $N_2$ and the water vapor to permeate into the baked piece or sheet, thereby forming a homogeneous system of the baked piece of sheet, the Na and the water vapor, followed by heating and/or depressurizing the homogenous system for a time sufficient to allow bubble nuclei to form and grow in the homogeneous system, thereby forming a forming a foam material;

step 5, carrying out compression molding on the foam material obtained in step 4.

2. The method according to claim 1, wherein the temperature inside the autoclave in step 4 is greater than a boiling point of water.

3. The method according to claim 1, wherein a volume ratio of the $N_2$ to the water vapor in step 4 is (3-7):1.

4. The method according to claim 1, wherein the pressure in the autoclave in step 4 is greater than 45 Mpa.

5. The method according to claim 1, wherein step 4 occurs over a time period of 4 to 8 hours.

* * * * *